(12) United States Patent
Protopopov et al.

(10) Patent No.: US 8,997,096 B1
(45) Date of Patent: *Mar. 31, 2015

(54) SCALABLE AND SECURE HIGH-LEVEL STORAGE ACCESS FOR CLOUD COMPUTING PLATFORMS

(71) Applicant: EMC Corporation, Hopkinton, MA (US)

(72) Inventors: Boris Protopopov, Acton, MA (US); Jurgen Leschner, Lexington, MA (US)

(73) Assignee: EMC Corporation, Hopkinton, MA (US)

( * ) Notice: Subject to any disclaimer, the term of this patent is extended or adjusted under 35 U.S.C. 154(b) by 270 days.

This patent is subject to a terminal disclaimer.

(21) Appl. No.: 13/693,605

(22) Filed: Dec. 4, 2012

Related U.S. Application Data

(63) Continuation of application No. 12/493,295, filed on Jun. 29, 2009, now Pat. No. 8,352,941.

(51) Int. Cl.
  *G06F 9/455* (2006.01)
  *H04L 9/32* (2006.01)

(52) U.S. Cl.
  CPC .................................. *H04L 9/3247* (2013.01)
  USPC ............... 718/1; 709/201; 709/217; 709/223; 709/238

(58) Field of Classification Search
  None
  See application file for complete search history.

(56) References Cited

U.S. PATENT DOCUMENTS

| | | | |
|---|---|---|---|
| 2009/0113424 A1* | 4/2009 | Chen et al. ........................ | 718/1 |
| 2009/0248845 A1 | 10/2009 | Waltermann et al. | |
| 2010/0235832 A1* | 9/2010 | Rajagopal et al. ................ | 718/1 |
| 2010/0251242 A1 | 9/2010 | Sivasubramanian et al. | |

* cited by examiner

*Primary Examiner* — Emerson Puente
*Assistant Examiner* — Dong Kim
(74) *Attorney, Agent, or Firm* — BainwoodHuang

(57) ABSTRACT

An untrusted component exposing a high level storage object interface within an untrusted client virtual machine accepts application level storage object operations. Responsive to a storage object operation, the untrusted component passes a message through the underlying hypervisor to an associated trusted component. The trusted component processes the message by authenticating the client virtual machine and locating an internal mapping between the client virtual machine and an associated customer-specific set of backend storage resources to which the requested storage object operation is to be applied. The trusted component uses a trust relationship with the backend storage system to securely communicate the storage object operation to the backend storage system, and passes the operation results through the hypervisor back to the untrusted component in the source client virtual machine from which the storage object request originated.

18 Claims, 6 Drawing Sheets

| ACCESS CONTROL TABLE 60 → | | | |
|---|---|---|---|
| CLIENT VIRTUAL MACHINE A | CUSTOMER SPECIFIC STORAGE RESOURCES SET 1 | ACCESS RIGHTS FOR CLIENT VIRTUAL MACHINE A | TRAFFIC SHAPING PARAMETERS FOR CLIENT VIRTUAL MACHINE A |
| CLIENT VIRTUAL MACHINE B | CUSTOMER SPECIFIC STORAGE RESOURCES SET 2 | ACCESS RIGHTS FOR CLIENT VIRTUAL MACHINE B | TRAFFIC SHAPING PARAMETERS FOR CLIENT VIRTUAL MACHINE B |
| CLIENT VIRTUAL MACHINE C | CUSTOMER SPECIFIC STORAGE RESOURCES SET 1 | ACCESS RIGHTS FOR CLIENT VIRTUAL MACHINE C | TRAFFIC SHAPING PARAMETERS FOR CLIENT VIRTUAL MACHINE C |
| CLIENT VIRTUAL MACHINE D | CUSTOMER SPECIFIC STORAGE RESOURCES SET 3 | ACCESS RIGHTS FOR CLIENT VIRTUAL MACHINE D | TRAFFIC SHAPING PARAMETERS FOR CLIENT VIRTUAL MACHINE D |

SCALABLE AND SECURE HIGH-LEVEL STORAGE ACCESS FOR CLOUD COMPUTING PLATFORMS

FIELD OF THE INVENTION

The disclosed system relates generally to cloud computing platforms and applications, and more specifically to methods and systems for providing scalable and secure high-level storage access for cloud computing platforms.

BACKGROUND OF THE INVENTION

As it is generally known, "cloud computing" typically refers to the use of remotely hosted resources to provide services to customers over one or more networks such as the Internet. Resources made available to customers are typically virtualized and dynamically scalable. Cloud computing services may include any specific type of application. Some cloud computing services are, for example, provided to customers through client software such as a Web browser. The software and data used to support cloud computing services are located on remote servers owned by a cloud computing service provider. Customers consuming services offered through a cloud computing platform need not own the physical infrastructure hosting the actual service, and may accordingly avoid capital expenditure on hardware systems by paying only for the service resources they use, and/or a subscription fee. From a service provider's standpoint, the sharing of computing resources across multiple customers (aka "tenants") improves resource utilization. Use of the cloud computing service model has been growing due to the increasing availability of high bandwidth communication, making it possible to obtain response times from remotely hosted cloud-based services similar to those of services that are locally hosted.

Cloud computing infrastructures often use virtual machines to provide services to customers. A virtual machine is a completely software-based implementation of a computer system that executes programs like an actual computer system. One or more virtual machines may be used to provide a service to a given customer, with additional virtual machines being dynamically instantiated and/or allocated as customers are added and/or existing customer requirements change. Each virtual machine may represent all the components of a complete system to the program code running on it, including virtualized representations of processors, memory, networking, storage and/or BIOS (Basic Input/Output System). Virtual machines can accordingly run unmodified application processes and/or operating systems. Program code running on a given virtual machine executes using only virtual resources and abstractions dedicated to that virtual machine. As a result of such "encapsulation", a program running in one virtual machine is completely isolated from programs running on other virtual machines, even though the other virtual machines may be running on the same underlying hardware. In the context of cloud computing, customer-specific virtual machines can therefore be employed to provide secure and reliable separation of code and data used to deliver services to different customers.

A hypervisor (or "virtual machine monitor") is a system program that provides a virtual environment in which multiple virtual machines can concurrently execute in isolation. The hypervisor provides the virtual execution environment over a physical "hypervisor domain" made up of one or more underlying host computer systems. The hypervisor manages allocation of physical resources from the hypervisor domain to the virtual machines executing in the virtual environment in a way that maintains code and data isolation between virtual machines. Physical resources in the hypervisor domain that are virtualized by the hypervisor for allocation to virtual machines include processor, memory, and other physical resources. Hypervisors referred to as "Type 1", "native" or "bare-metal" hypervisors run directly on the host's hardware as a hardware control and guest operating system monitor. Other hypervisors referred to as "Type 2" or "hosted" hypervisors are software applications running within a conventional operating system environment. In addition to physical resource virtualization and allocation, hypervisors may also provide virtual machines with other specific services, such as transport services enabling communication between virtual machines.

Traditional approaches to storage virtualization in virtual execution environments offer block-level storage, i.e. virtual block devices. Such storage is easily used by one virtual machine, but cannot be easily shared in a secure and scalable way as is. This results in problems when it is desirable to have higher-level sharing, e.g. at the file system and/or database level. For example, a customer using a collection of virtual machines located within the service provider cloud may desire to store computation results persistently within the cloud at the file or database level, in order to allow convenient, high-level data sharing across multiple virtual machines. With existing systems, such higher-level sharing must be implemented either by the cloud-based service consumer, for example using clustered file system or clustered database software in the virtual machine cluster, or by the cloud-based service provider using consolidated, shared back-end storage systems. In the former case, the responsibility for configuration and management of the shared storage falls on the service consumer, meaning that the cloud computing platform fails to deliver the truly virtualized storage service desired by the service consumer, and does not reduce the consumers' management tasks to a minimum. In the latter case, a straightforward application of "physical world" technologies needed to support secure multi-tenant cloud consumer virtual machine access to consolidated shared backend storage incurs significant overhead for network traffic separation, encryption and protocol security, requiring highly complex security and networking infrastructure to ensure the privacy of storage-related communications within the customer domains. Such complexity of implementation can be excessively costly using existing approaches when potentially thousands of customer partitions (i.e. dedicated subsets of infrastructure) must be supported by the cloud service provider.

One example of an existing cloud-based storage solution is Amazon Elastic Block Store (EBS), which is part of the Amazon Web Services™ offered over the Internet by Amazon.com, Inc. EBS provides persistent block level storage volumes for virtual private servers in the computer cloud. However, EBS cannot be shared by virtual machines as is. As a result, virtual machines need to run a distributed file system, or the EBS block storage needs to be exported over a Network Attached Storage (NAS) protocol. Existing solutions such as EBS disadvantageously require the service customer to implement any higher level data sharing that may be needed to support distributed applications executing across the customer's multiple physical and/or virtual machines.

It would accordingly be desirable to have a new method and system for providing scalable and secure high-level storage access for cloud computing platforms that addresses the aforementioned and other shortcomings of prior approaches.

SUMMARY OF THE INVENTION

To address the above described and other shortcomings of previous approaches, a new method and system are disclosed for providing scalable and secure high-level storage access for cloud computing platforms. In the disclosed system, a component that is untrusted from the perspective of the cloud service provider (an "untrusted component") and exposes a high level storage object interface is contained within an untrusted client virtual machine executing in a hypervisor-based virtual environment. The untrusted component accepts application level storage object operations, such as file system or database commands, that are submitted to its storage object interface. In response to receipt of a storage object operation, the untrusted component passes a message through a secure hypervisor-based transport service to an associated component that is deployed and managed by the cloud service provider (a "trusted component"). The trusted component may, for example, be contained in a separate virtual machine, or within the hypervisor itself. The message passed through the hypervisor identifies the source client virtual machine from which the storage operation was received by the hypervisor, allowing straightforward enforcement of multi-tenant isolation.

The secure hypervisor based transport through which the storage object operation is passed may take various specific forms. Examples include a hypervisor call ("hypercall"), a special-purpose shared memory based transport, and hypervisor-local virtual networking services provided by the hypervisor to virtual machines in the virtual environment. Hypervisor services may also be used as a basis for authentication of the requesting client virtual machine, for example by using virtual machine identifiers issued by the hypervisor that cannot be forged.

The trusted component processes the message received from the hypervisor in part by locating an internal mapping between the identity of the source client virtual machine for the operation and an indication of a customer-specific set of backend storage resources to which the requested storage object operation is to be applied. The trusted component may also use the source client virtual machine identity to determine one or more virtual machine-specific storage access parameters. The storage access parameters may, for example, include storage access rights and/or traffic shaping parameters associated with the requesting client virtual machine, and that are to be applied to the request within the trusted component and/or within the backend storage system.

The trusted component uses an established trust relationship with the backend storage system to communicate the storage object operation to the backend storage system (e.g. using protocols internal to the backend storage system). The trusted component indicates the customer-specific set of back-end storage resources that the operation is to be applied to when it passes the storage operation to the back-end storage system. For example, in the case where the back-end storage system natively supports multi-tenancy, such indication may be made by including an identifier of the customer-specific set of back-end storage resources with the operation, such as a tenant identifier or the like. In this case, the resource set identifier is understood by the back-end storage system, and used by the back-end storage system to identify the customer-specific set of back-end storage resources to which the operation is to be applied. Alternatively, in the case where the back-end storage system does not natively support multi-tenancy, the trusted component may indicate the customer-specific set of back-end storage resources by directing the operation directly to the customer-specific set of back-end storage resources, for example by sending the operation to a specific instance of back-end storage resources (e.g. file system instance, database instance, etc.) that is known by the trusted component to be within or make up the customer-specific set of back-end storage resources associated with the requesting client virtual machine.

When the results of the storage object operation are communicated from the backend storage system to the trusted component (e.g. again using the backend storage system's internal protocols), the trusted component passes the results through the hypervisor back to the source client virtual machine from which the storage object request originated. The untrusted component receives the operation results and passes them to the requesting client application program.

In the disclosed system, the storage software stack is effectively split into "open/generic" and "private/protected" portions. The untrusted component is exposed directly to the application in the untrusted client virtual machine, offering native application programming interfaces (APIs) to client applications for access to storage (e.g. file system or database). The trusted component privately maintains a mapping between client virtual machines and corresponding shares of the backend storage resources, thus supporting secure isolation of virtualized storage resources between customers.

The disclosed system offers multiple advantages over previous solutions. These advantages include providing higher level access to customer-specific virtual storage, such as through file system and/or database level commands. The disclosed system also effectively leverages a two-tier cloud communications infrastructure for communications between client virtual machines and trusted components, and communications between trusted components and backend cloud storage. In the first tier, customer-specific client virtual machines communicate with trusted components over a secure hypervisor-based transport with high bandwidth and low latency. In the second tier, trusted components communicate with the backend store over networking provided within the cloud storage trusted environment. The trusted components accordingly form an "edge" of the storage cloud, and present a scalable caching layer that moderates the load on the networking infrastructure and backend store itself.

The disclosed system leverages hypervisor-based transport security to communicate messages between the open and trusted components. Networking provisioning and management complexity are reduced, and virtual machine-based authorization of access to shared storage is used, providing protection against compromised or malicious customer-side virtual machines. The disclosed system further supports convenient addition of multi-tenancy capabilities to backend storage systems, and further facilitates delivery of legacy storage services in a cloud computing environment.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 4 is a block diagram showing an access control table used to map client virtual machine identifiers to customer-specific sets of storage resources and virtual-machine-specific storage access parameters in an illustrative embodiment;

DETAILED DESCRIPTION OF EXEMPLARY EMBODIMENTS

Figure 1:
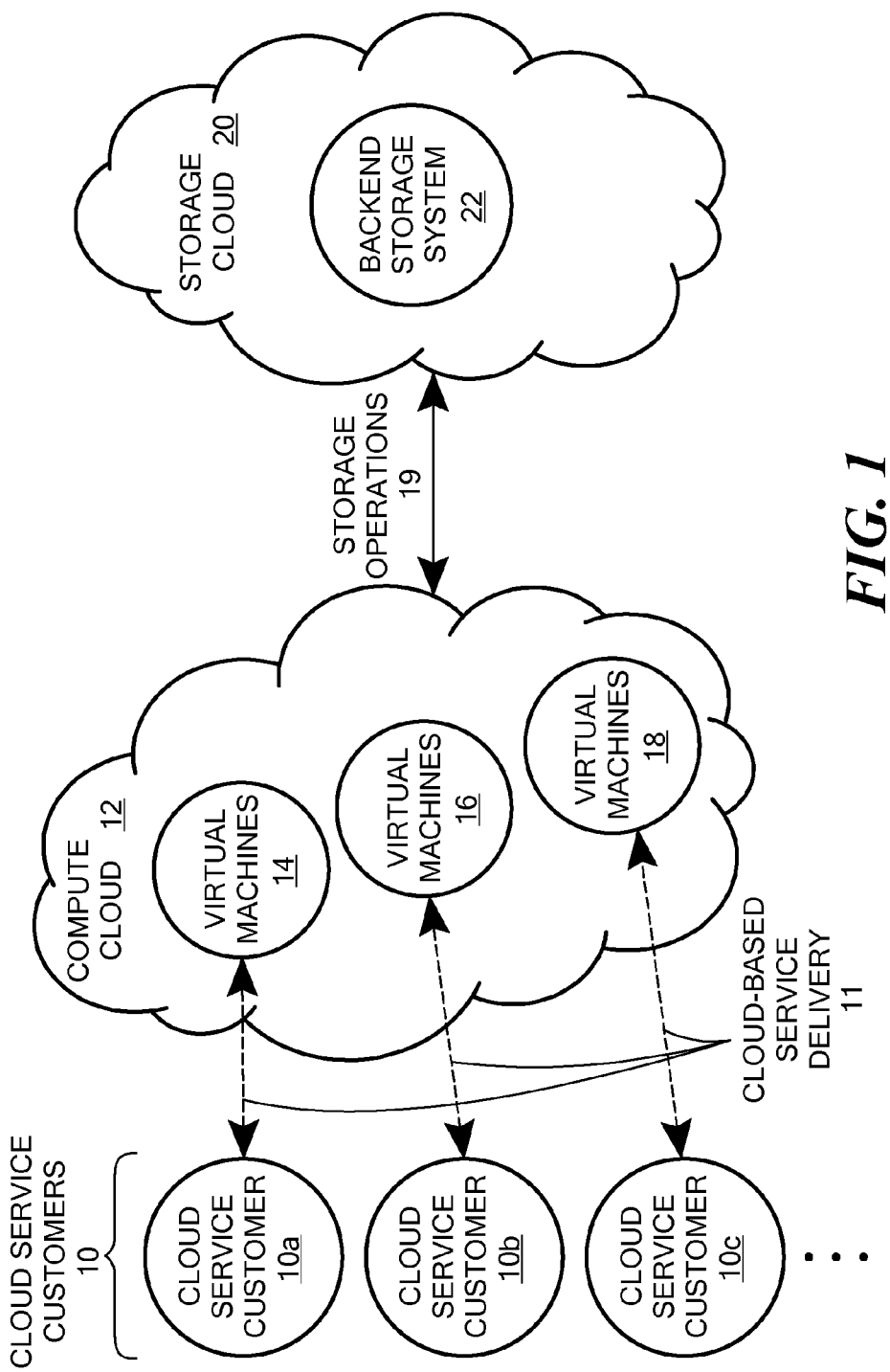
FIG. 1 is a block diagram showing software and/or hardware components in an illustrative embodiment.

FIG. 1 is a block diagram showing software and/or hardware components in an illustrative embodiment of the disclosed system. As shown in FIG. 1, a number of Cloud Service Customers 10 (e.g. Cloud Service Customer 10a, Cloud Service Customer 10b, Cloud Service Customer 10c, etc.) receive one or more services that are provided remotely at least in part by the Compute Cloud 12. The services are delivered from the Compute Cloud 12 to the Cloud Service Customers 10 over one or more communication networks, such as the Internet, as shown for purposes of illustration in FIG. 1 by Cloud-Based Service Delivery 11. The services provided by Compute Cloud 12 to Cloud Service Customers 10 may include any specific type of service, including, for example, common business applications or the like that are accessed over the Internet through a Web browser executing on a user's client computer system, or any other specific type of service. The software providing the services to the Cloud Service Customers 10 executes on server computer systems managed by a cloud service provider business entity, for example within a data center owned and operated by the cloud service provider.

In order to provide each one of the Cloud Service Customers 10 with individualized service, the Compute Cloud 12 instantiates one or more virtual machines for each one of the Cloud Service Customers 10. As shown in FIG. 1, Virtual Machines 14 are used exclusively to provide a service to Cloud Service Customer 10a, Virtual Machines 16 are used exclusively to provide a service to Cloud Service Customer 10b, and Virtual Machines 18 are used exclusively to provide a service to Cloud Service Customer 10c. By dedicating a set of virtual machines to each individual customer, the Compute Cloud 12 ensures that any computational activity (e.g. application program execution) involved in servicing one customer cannot interfere with service delivery to another customer, and that all such computational activity is private to each customer. Moreover, as the computation needs of a given customer change, the number of virtual machines assigned to that customer can be dynamically adjusted as needed within the Compute Cloud 12.

Data used by cloud-based services provided to Cloud Services Customers 10 is stored within a Storage Cloud 20, which may similarly include a number of storage devices and associated server computer systems also managed by the same cloud service provider business entity, within the same or another data center owned and operated by the cloud service provider. The Storage Cloud 20 is shown including at least one Backend Storage System 22, including one or more network file systems and/or database management systems. As described further below, the disclosed system conveys high level storage object commands (e.g. file system and/or database commands) and associated results between applications executing on virtual machines in the Compute Cloud 12 and Backend Storage System 22, as shown in FIG. 1 by Storage Operations 19, for example over a private LAN or other type of private network that is under the control of the cloud service provider. The disclosed system also supports partitioning of storage resources within the Storage Cloud 20 (e.g. directories, databases, file systems, etc.) into private, customer-specific back-end storage resource sets that are each only accessible to corresponding ones of the Cloud Service Customers 10. Various specific types of back-end storage resources may be partitioned into the customer-specific back-end storage resource sets of the disclosed system, including disk sets, storage object sets, directory sub-trees, database tables or portions of database tables, and/or instances of file systems or databases.

Those skilled in the art will recognize that each of Cloud Service Customers 10 may include one or more customer computer systems and/or intelligent electronic devices, such as desktop, laptop, or palmtop computer systems, personal digital assistants, cell phones, or other electronic devices. Each such customer system may include or control a display device capable of displaying a graphical user interface including data and/or information generated at least in part based on a cloud-based service provided through the Compute Cloud 12 and/or Storage Cloud 20, such as a liquid crystal display (LCD), cathode ray tube (CRT), interferometric modulator display (IMOD), light emitting diode (LED), or the like. Those skilled in the art will further recognize that the aforementioned customer systems, as well as server computer systems in the Compute Cloud 12 and Storage Cloud 20, may each include one or more processors, program and/or data storage, such as memory, for storing program code executable on such processors, and input/output devices and/or interfaces. The systems within each of the Cloud Service Customers 10, the Compute Cloud 12, and the Storage Cloud 20, are all communicably connected by one or more communication networks, such as, for example, a Local Area Network (LAN), the Internet, and/or some other specific type of communication network.

Figure 2:
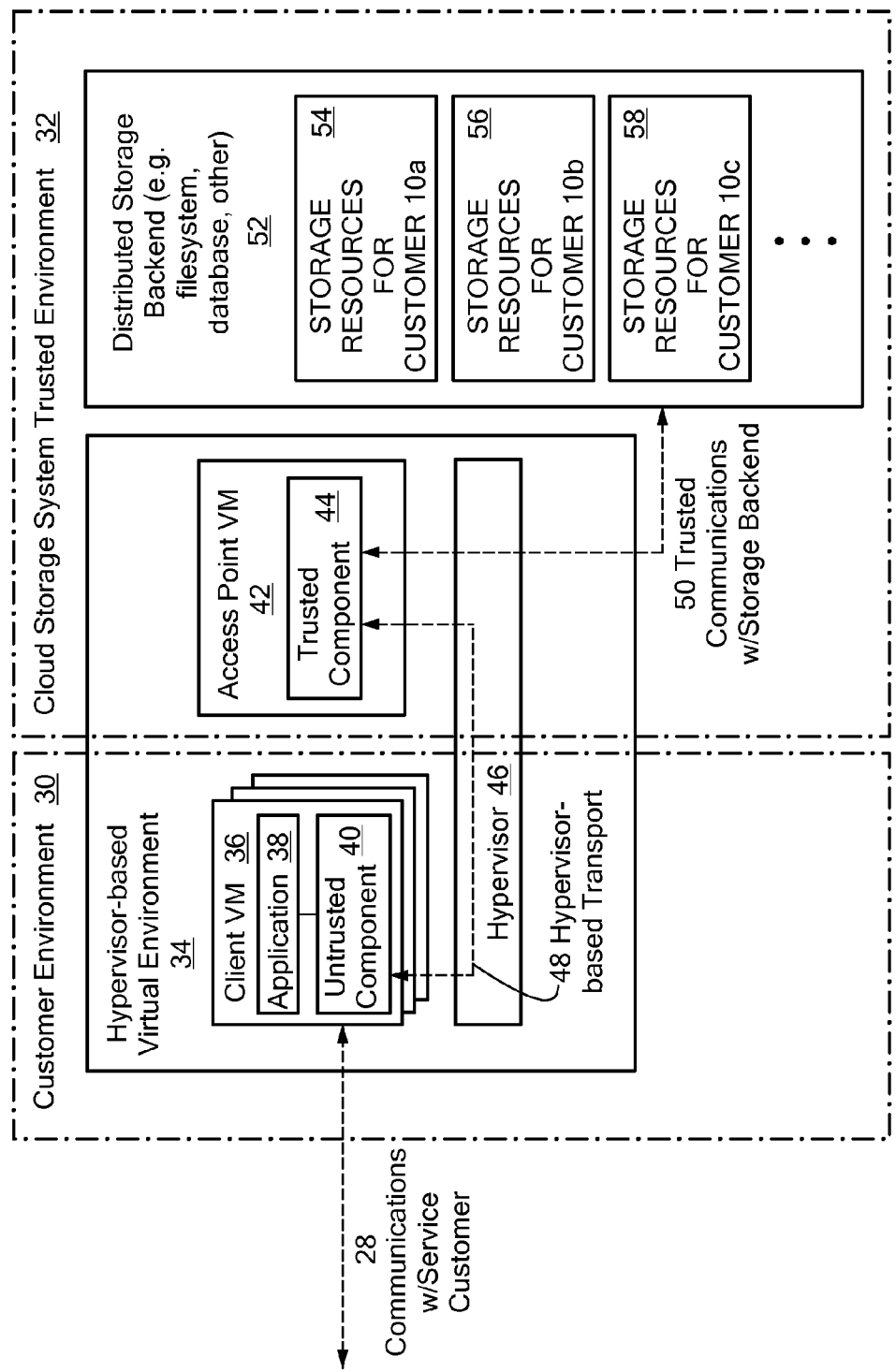
FIG. 2 is a block diagram showing details of software and/or hardware components in an illustrative embodiment.

FIG. 2 is a block diagram showing further details of software and/or hardware components in an illustrative embodiment. As shown in FIG. 2, a Hypervisor-based Virtual Environment 34 includes components located in a Customer Environment 30 and in a Cloud Storage System Trusted Environment 32. Specifically, a number of client virtual machines within the Customer Environment 30, shown for purposes of illustration as Client Virtual Machine 36, each include an Application 38 and an Untrusted Component 40 of the storage software stack. A number of access point virtual machines within the Cloud Storage System Trusted Environment 32, shown for purposes of illustration as Access Point Virtual Machine 42, each include a Trusted Component 44 of the storage software stack. Client Virtual Machine 36 corresponds to one of the virtual machines shown within the Compute Cloud 12 providing a cloud-based service to one of the Cloud Service Customers 10. The Hypervisor-based Virtual Environment 34 and the components therein are hosted by one or more of the server computer systems in the Compute Cloud 12 of FIG. 1. The Hypervisor 46 operates as a virtual machine monitor (VMM), providing a virtualization environment allowing multiple virtual machines to run concurrently on the underlying host computer system(s). The Hypervisor 46 manages allocation of the underlying host systems' processor, memory, and other physical resources to the virtual machines executing thereon in a way that maintains code and data isolation between virtual machines.

During operation of the components shown in FIG. 2, Application 38 executes within Client Virtual Machine 36 to perform computations supporting a service provided to a cloud service customer over Communications 28. Communications 28 include communications over one or more networks external to the Cloud Storage Trusted Environment 32, for example including public networks such as the Internet and/or one or more customer-operated and controlled networks. The Untrusted Component 40 includes an application programming interface (API) that can accept high level storage object operations, including high level file system and/or database operations, from the Application 38.

For example, the high level storage object operations accepted by the Untrusted Component 40 may generally be any specific type of storage operations providing application access to storage objects such as files, directories, and/or database records, and/or to collections of such objects. Examples of a storage object collection include a file system instance, a record set, a table of records, and a database instance. The storage object operation interface provided by the Untrusted Component 40 may advantageously be compatible with interfaces that would alternatively be available to the application from "native" file system or database clients, such as POSIX (Portable Operating System Interface for Unix) file system APIs, Microsoft® SQL Native Client APIs, and others.

Various specific types of high level storage object operations may be accepted by the Untrusted Component 40 of the disclosed system. For example, the Untrusted Component 40 may accept file-level file system API calls, such as file create, file read, file open, file write, and/or file delete operations. Other examples of file system storage object operations that may be accepted by the Untrusted Component 40 include file attribute get and/or set operations, file directory commands (e.g. change directory, make directory, etc.), and/or file system mount and unmount commands. In one embodiment, processing of a file system mount request includes taking steps to make a file system hosted in the back-end storage system ready for use by the requesting client virtual machine, for example including reading certain index data structures from the back-end storage into the client virtual machine in anticipation of future operations performed on the file system. The access rights granted to the requesting client virtual machine for a mount operation may, for example, be the lesser of the rights requested by the client virtual machine and access rights specified for the requesting client virtual machine in an Access Control Table (see FIG. 4). Examples of database system storage object operations that may be accepted by the Untrusted Component 40 include a database session login, a database query, and/or insertion/removal of database records from a table.

Upon receipt of a storage object operation from Application 38, the Untrusted Component 40 passes the storage object operation through the Hypervisor 46 to the Trusted Component 44. In the illustrative embodiment of FIG. 2, the Trusted Component 44 is located within the Access Point Virtual Machine 42. As shown in FIG. 2, the Untrusted Component 40 uses a secure Hypervisor-based Transport 48 to pass a message containing the storage object operation to the Trusted Component 44. The Hypervisor-based Transport 48 may, for example, be a shared memory type of communication provided between virtual machines in the Hypervisor-based Virtual Environment 34 by the Hypervisor 46, and accordingly accessible through a message passing or other specific type of interface provided by the Hypervisor 46 to the Untrusted Component 40.

Specifically, by virtue of having full control over the physical resources of the hypervisor domain, and over access to those resources by all virtual machines in the hypervisor-based virtual environment, the Hypervisor 46 is able to effectively maintain the privacy and security of the Hypervisor-based Transport 48, such that so long as the Hypervisor 46 is not compromised (i.e. the hypervisor security measures are not defeated), communications between the Untrusted Component 40 and the Trusted Component 44 over the Hypervisor-based Transport 48 cannot be intercepted or interfered with by other virtual machines. The Hypervisor 46 may also form a basis for authentication of Client Virtual Machine 36 by providing virtual machine identifiers that cannot be forged (again assuming that the Hypervisor 46 itself is not compromised). For example, the Hypervisor 46 may assign a virtual machine transport address to each virtual machine, to be used as the basis for communications between virtual machines, and that cannot be forged by virtual machines in the Hypervisor-based Virtual Environment 34. When used as virtual machine identifiers by the disclosed system, such un-forgeable transport addresses assigned by the Hypervisor 46 may be used as the basis for strong authentication by Trusted Component 44. Examples of secure hypervisor-based transports include VMware® VMCI (Virtual Machine Communication Interface) and VmWare local (within a single hypervisor) virtual networking. Examples of hypervisor-assigned transport addresses that cannot be forged include VmWare vNIC Ethernet addresses, when used in combination with VmWare vSwitch security settings that prevent changes of vNIC Ethernet addresses.

The message passed by the Untrusted Component 40 to the Trusted Component 44 may, for example, be formatted by the Untrusted Component 40 as a remote procedure call (RPC). The message passed by the Untrusted Component 40 to the Trusted Component 44 may further include credentials (e.g. user name and password) of a user that requested or is otherwise associated with the storage object operation, as passed to the Untrusted Component 40 from the Application 38. For example, if the interface provided by the Untrusted Component 40 to the Application 38 includes an explicit user session login, e.g. in the case of some database system operations, then user name/password or other user authentication tokens are received from the Application 38, passed from the Untrusted Component 40 to the Trusted Component 44, and then conveyed to the backend storage system for application-level authentication. Alternatively, in the case of file system operations, where the user has previously been authenticated, user credentials passed from Untrusted Component 40 to Trusted Component 44 and on to the back-end storage system may include user and group IDs that can be used by the backend storage system to authorize access to specific storage objects.

When the Trusted Component 44 receives the message from Untrusted Component 40, it determines the identity of the client virtual machine that originated the storage object operation contained in the message, for example using an identifier uniquely identifying Client Virtual Machine 36 and contained in the message. Using the identity of the source client virtual machine, the Trusted Component 44 determines a set of backend storage resources dedicated to providing service to a customer associated with that client virtual machine. The Trusted Component 44 then uses Trusted Communications 50 between the Access Point Virtual Machine 42 and the backend storage system, shown in FIG. 2 as Distributed Storage Backend 52, to pass the storage object operation and user credentials to the backend storage system, in a way that ensures that the operation will be applied to the correct customer-specific set of storage resources.

In an embodiment in which the back-end storage system implements multi-tenancy natively, the client virtual machine identifier is translated to a tenant identifier uniquely associated with the customer for the client virtual machine, and the tenant identifier is passed to the back-end storage system, and the back-end storage system maps the tenant identifier to the correct customer-specific set of storage resources to which the operation is to be applied. Alternatively, in an embodiment in which back-end storage system does not natively support multi-tenancy, the client virtual machine identifier is mapped to an instance or partition of the back-end storage system to which the storage operation is directly conveyed by the Trusted Component 44. In either case, steps may be taken to authenticate the requesting client virtual machine identifier prior to forwarding the storage object operation to the back-end storage system. In the case where hypervisor-based authentication is used, the client virtual machine identifier received by the Trusted Component 44 may be guaranteed to be authentic, and no further authentication is necessary. Alternatively, if hypervisor-based authentication is not available, the disclosed system may be embodied such that other techniques are used for client virtual machine identity authentication, such as authentication based on keyed HMACs (Hashed Message Authentication Codes), which are a digital signature on a part of the message created using a shared secret key.

Trusted Communications 50 may, for example, be based on internal protocols specific to the Distributed Storage Backend 32 (e.g. a distributed file system protocols) passed over a network-based transport (e.g. over an Internet Protocol (IP) based transport). In the illustrative embodiment of FIG. 2, Trusted Communications 50 occur within a single data center over private, high-speed LAN connections internal to the data center, taking advantage of co-location of the compute cloud and storage cloud resources. Additional security features such as encryption and strong authentication are accordingly not required to protect the storage system internal protocols, as would be necessary in an untrusted networking environment. In this way, communications within the Cloud Storage System Trusted Environment 32, such as the Trusted Communications 50, may conveniently be protected using networking traffic separation provided within the communication infrastructure of the Cloud Storage System Trusted Environment 32. The illustrative networking traffic separation measures include physical isolation of the networking infrastructure used to communicate within the Cloud Storage System Trusted Environment, using VLANs (Virtual Local Area Networks).

Upon receipt of the communication from the Access Point Virtual Machine 42 over Trusted Communications 50, the Distributed Storage Backend 52 determines whether the user indicated by the credentials passed with the message is authorized to perform the requested operation. If so, the Distributed Storage Backend 52 performs the requested storage object operation on the customer-specific set of storage resources to which the operation is directed.

For example, as shown in FIG. 2, Distributed Storage Backend 52 includes 1) Storage Resources 54 for Customer 10a, 2) Storage Resources 56 for Customer 10b, and 3) Storage Resources 58 for Customer 10c. If the message passed from the Trusted Component 44 over Trusted Communications 50 indicates that the storage object operation is to be performed on Storage Resources 56 (e.g. because the source Client Virtual Machine 36 for the request was mapped to that resource set in the Access Control Table), then the Distributed Storage Backend 52 checks the credentials passed with the message against access authorizations specifically associated with Storage Resources 56.

The results of the storage object operation are passed back from the Distributed Storage Backend 52 to the Trusted Component 44 in the Access Point Virtual Machine 42. The operation results are passed from the Trusted Component 44 through the Hypervisor-based Transport 48 to the Untrusted Component 40, which may in turn pass them to the requesting Application 36 to support the cloud-based service provided to the service customer over Communications 28.

In one embodiment, requests for storage object operations can be satisfied by the Trusted Component 44 using information which was cached from earlier replies received from the Distributed Storage Backend 52. In such a case, the Untrusted Component 40 does not have to go beyond the Trusted Component 44 into the Distributed Storage Backend 52 to fulfill application level storage object operation requests. This, in turn, results in a caching layer made up of trusted components that reduces/moderates the load on the Distributed Storage Backend 52 and the networking infrastructure that connects the trusted components to the Distributed Storage Backend 52 (e.g. Trusted Communications 50).

Figure 3:
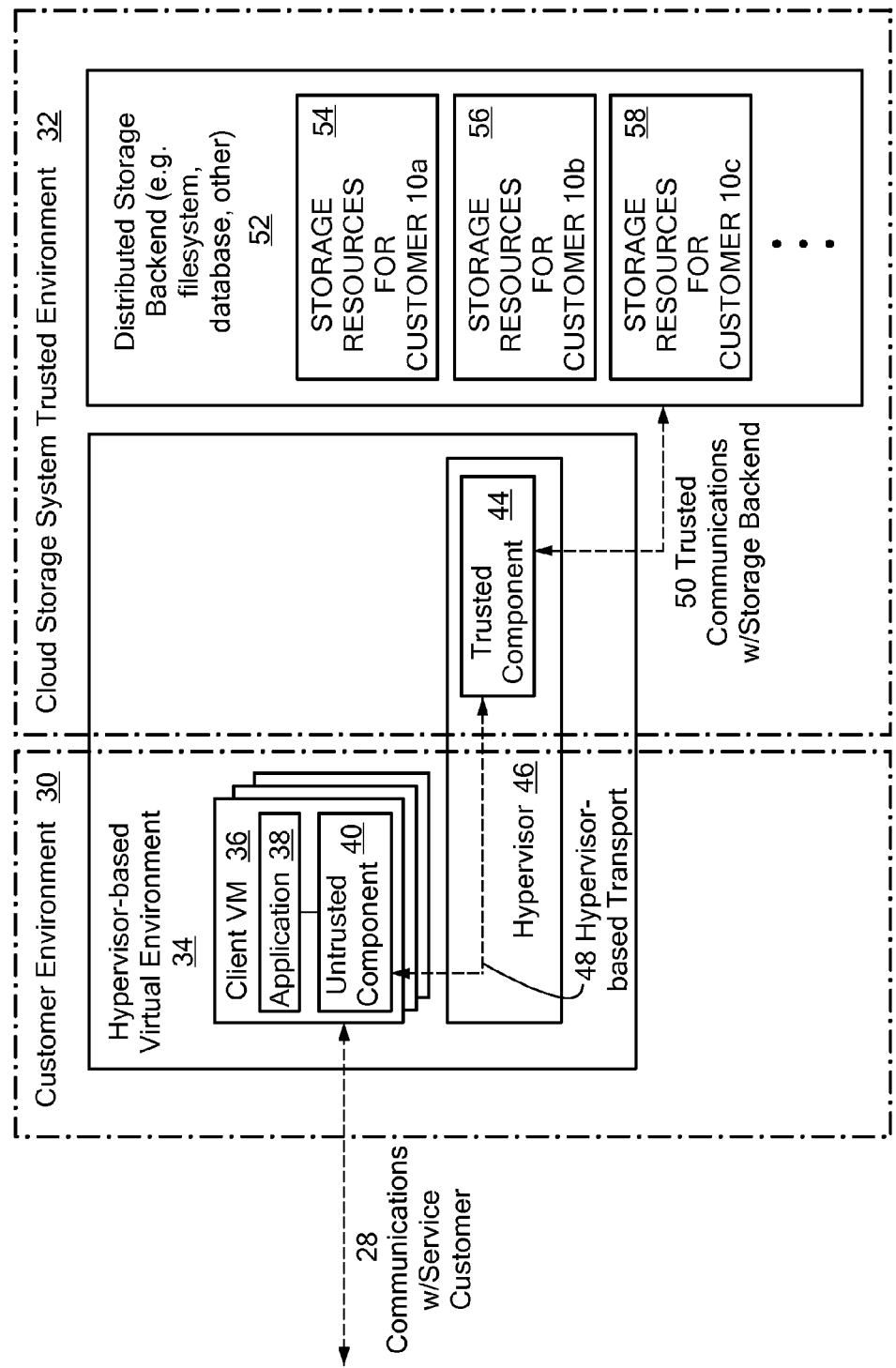
FIG. 3 is a block diagram showing details of software and/or hardware components in an alternative illustrative embodiment.

FIG. 3 is a block diagram showing details of software and/or hardware components in an alternative illustrative embodiment. As shown in FIG. 3, the Trusted Component 44 is not contained within the Access Point Virtual Machine 42 as in the illustrative embodiment of FIG. 2, but is instead located within the Hypervisor 46. Accordingly, in the embodiment of FIG. 3, the Hypervisor-based Virtual Environment 34 does not include any access point virtual machines, and Trusted Communications 50 are directly between the Trusted Component 44 and the Distributed Storage Backend 52. In other respects, the embodiment of FIG. 3 operates as described above with reference to the embodiment shown in FIG. 2.

FIG. 4 is a block diagram showing an Access Control Table 60 used to map client virtual machine identifiers to customer-specific sets of back-end storage resources and client virtual machine-specific storage access parameters in an illustrative embodiment. As shown in FIG. 4, the Table 60 includes a number of entries (e.g. 60a, 60b, 60c, 60d, etc.), each of which maps an identifier of a client virtual machine (e.g. Client Virtual Machine A, Client Virtual Machine B, Client Virtual Machine C, Client Virtual Machine D, etc.) to an associated customer-specific set of backend storage resources (e.g. Customer Specific Storage Resources Set 1, Customer Specific Storage Resources Set 2, and Customer Specific Storage Resources Set 3, etc.) to be used to satisfy storage object operations received from that client virtual machine. In the example of FIG. 4, storage object operations received from Client Virtual Machine A and Client Virtual Machine C are applied to Customer Specific Storage Resources Set 1, storage object operations received from Client Virtual Machine B are applied to Customer Specific Storage Resources Set 2, and storage operations received from Client Virtual Machine D are applied to Customer Specific Storage Resources Set 3. Thus Client Specific Storage Resources Set 1 is associated with both Client Virtual Machine A and Client Virtual Machine B, for example because both Client Virtual Machine A and Client Virtual Machine B are allocated to provide service to a single service customer.

In an embodiment in which the back-end storage system natively supports multi-tenancy, indication of the customer-specific set of storage resources for a given client virtual machine may be maintained in the Access Control Table 60 as a tenant identifier or the like that is passed to and understood by the backend storage system. Alternatively, in an embodiment in which the back-end storage system does not natively support multi-tenancy, indication of the customer specific set of storage resources for a given client virtual machine may be maintained in the Access Control Table 60 as a name and/or address of the customer specific set of storage resources as required by the backing store access protocols, such as, for example, an <IP address:port:share ID> or <IP address:port> tuple for a backing store access point, a root directory location, or any other specific type of name and/or address to which the trusted component will pass the storage object operation directly.

Also contained in the Access Control Table 60 are a number of storage access parameters, shown in FIG. 4 as client virtual machine specific access rights and traffic shaping parameters. When processing a received storage object operation, the trusted component refers to the storage access parameters associated with the requesting client virtual machine, and applies the associated storage access parameters to the operation. For example, when a storage object operation is received from Client Virtual Machine A, that operation is processed by the trusted component and/or backend storage system subject to Access Rights for Client Virtual Machine A. If the Access Rights for Client Virtual Machine A do not indicate that the requested operation is permitted on the object indicated in the request, then the trusted component and/or backend storage system will prevent the operation from being performed (e.g. the trusted component will not forward the operation to the backend storage system).

Similarly, when a storage object operation is received from Client Virtual Machine A, that operation is processed by the trusted component and/or backend storage system subject to the Traffic Shaping Parameters for Client Virtual Machine A. Traffic shaping parameters that may be stored in the Access Control Table 60 include parameters for shaping storage object request traffic on a per-client virtual machine basis, for example based on request bandwidth and request rate. The trusted component applies the client virtual machine-specific traffic shaping parameters on a per-storage object message basis. For example, a given request metric may be shaped using three stored parameters setting limits on storage object request traffic between the trusted component and the back-end storage system: 1) sustained/average, 2) peak/maximum, and 3) burst size (i.e. how much traffic above average is allowed at once). Accordingly, for request bandwidth, the stored limits would be: 1) average bandwidth (bytes/sec), 2) peak bandwidth (bytes/sec), and 3) burst size (bytes). Analogously, for request rate, the stored limits would be: 1) average rate (requests/sec), 2) peak rate (requests/sec), and 3) burst size (requests). Traffic shaping by the trusted component with regard to request bandwidth advantageously limits I/O (Input/Output) load on the back-end storage system, while traffic shaping with regard to request rate advantageously limits metadata processing load on the back-end storage system.

In one embodiment, the Access Control Table 60 or its equivalent may be stored within the trusted component or elsewhere within the access point virtual machine. Alternatively, the Access Control Table 60 or its equivalent may be stored within the hypervisor. In an embodiment in which the Access Control Table 60 is stored within the hypervisor, and the trusted component is contained within an access point virtual machine, the Access Control Table 60 may be accessed by the trusted component using hypervisor-provided interfaces.

While for purposes of explanation a table data structure is shown for mapping client virtual machines to customer-specific sets of backend storage resources in FIG. 4, those skilled in the art will recognize that any other specific type of structure may be used in the alternative to provide such mappings.

The values in the Access Control Table 60 may, for example, be made accessible to a system administrator through a system administrator user interface or the like. Such accessibility advantageously allows the system administrator to dynamically control access rights and traffic shaping parameters on a per-virtual machine basis, and to control the mappings of specific virtual machines to customer-specific sets of backend storage resources.

Figure 5:
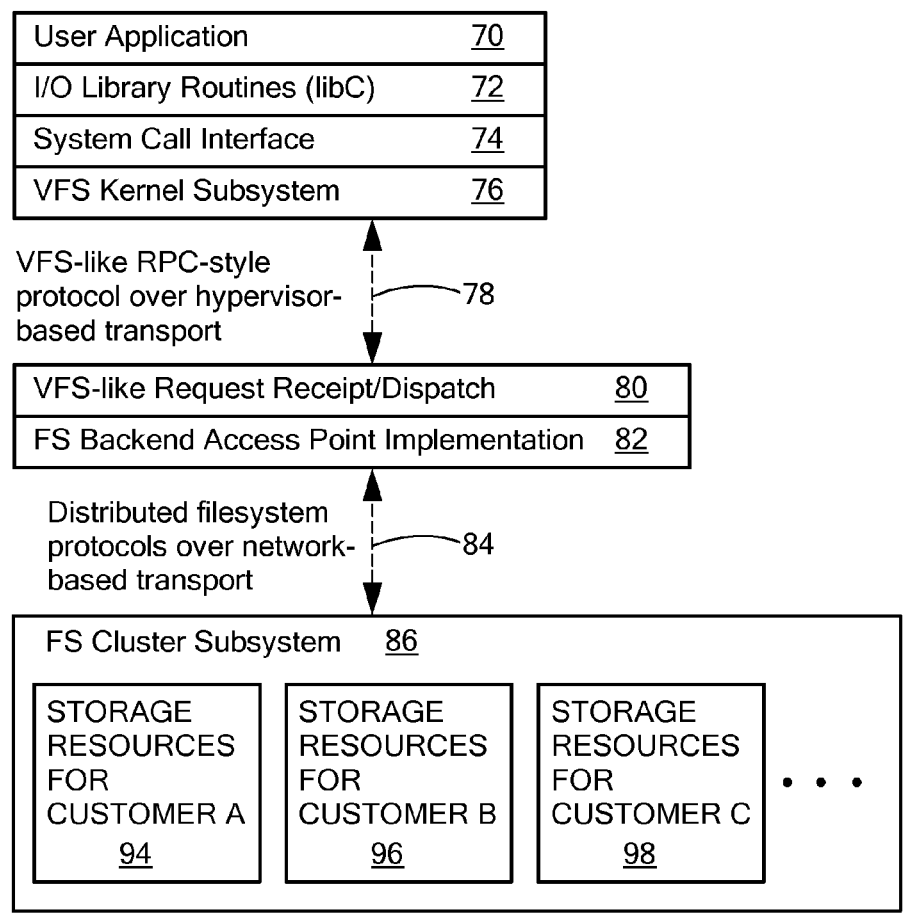
FIG. 5 is a block diagram of a storage software stack showing the organization of storage software components in an illustrative embodiment.

FIG. 5 is a block diagram showing a storage software stack showing the organization of storage software components in an illustrative embodiment. As shown in FIG. 5, a User Application 70 executes on top of I/O (Input/Output) Library Routines (libC) 72, which in turn are over a System Call Interface 74, which is layered over a VFS (Virtual File System) Kernel Subsystem 76. In the embodiment of FIG. 5, the layers 70, 72, 74 and 76 are contained within the client virtual machine (e.g. Client Virtual Machine 36 in FIGS. 2 and 3).

The VFS Kernel Subsystem 76 receives a storage object operation through the System Call Interface 74. As shown at 78 in FIG. 5, a VFS-like RPC (Remote Procedure Call)-style protocol is used to communicate the storage object operation over a hypervisor-based transport (e.g. Hypervisor-based Transport 48 in FIGS. 2 and 3). The storage object operation is received by a VFS-like Request/Dispatch layer 80. The VFS-like Request/Dispatch layer determines the appropriate storage resource set for the storage object operation based on the identity of the requesting client virtual machine, and uses an FS (File System) Backend Access Point Implementation 82 to communicate with an FS (File System) Cluster Subsystem 86, using distributed file system (DFS) protocols over a network transport (e.g. IP), as shown in FIG. 5 at 84. In the embodiment of FIG. 5, the layers 80 and 82 are contained within a trusted component (e.g. Trusted Component 44 in FIGS. 2 and 3).

The FS Cluster Subsystem 86 determines whether the requested storage object operation is authorized with regard to the specified set of storage resources. If so, the operation is performed, and the results passed back through layers 82, 80, 76, 74, and 72 to the User Application 70. As shown in FIG. 5, the FS Cluster Subsystem 86 is partitioned into sets of storage resources used to provide services for corresponding customers, such as Storage Resources 94 for Customer A, Storage Resources 96 for Customer B, Storage Resources 98 for Customer C, and so on.

Figure 6:
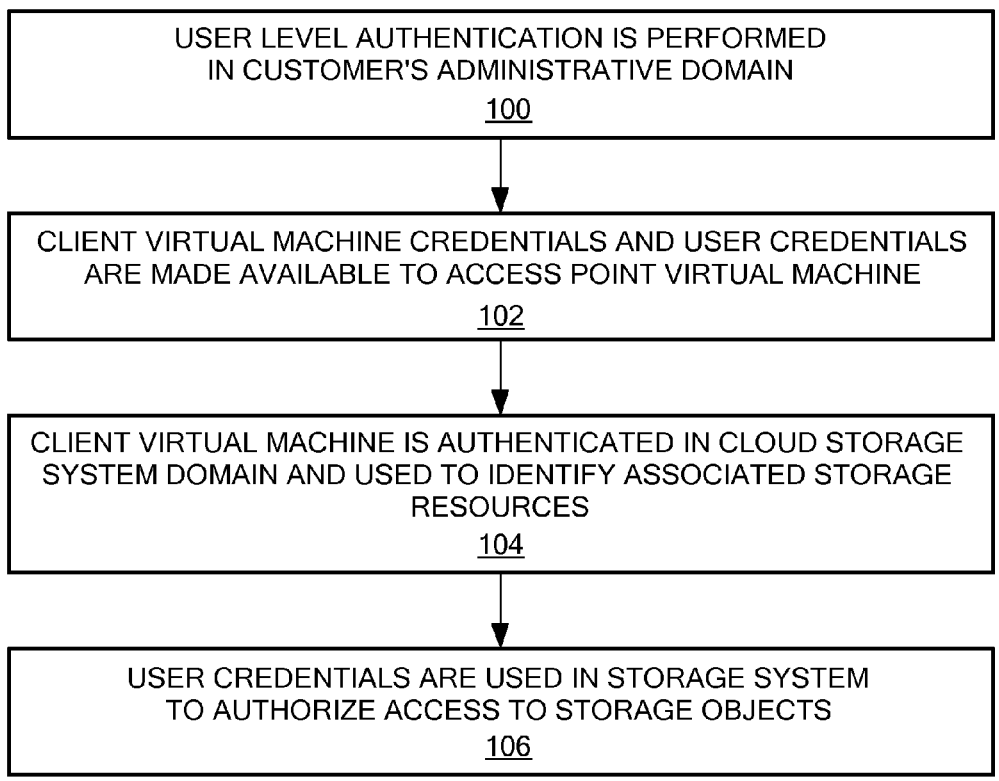
FIG. 6 is a flow chart showing steps performed during operation of an illustrative embodiment.

FIG. 6 is a flow chart illustrating steps performed during operation of an illustrative embodiment. At step 100, user level authentication is performed in the customer's administrative domain (e.g. Customer Environment 30 of FIGS. 2 and 3). For example, a user that works within an organization that is one of the Cloud Service Customers 10 shown in FIG. 1 (e.g. Cloud Service Customer 10a) logs into a cloud service provided to the customer over the Communications 28 shown in FIGS. 2 and 3. The log in performed could require the user to provide credentials, such as a user name and password, that are verified within the Customer Environment 30 to authenticate the user, for example by comparison with copies stored within the Customer Environment 30 (e.g. within a system of Cloud Service Customer 10a). If the user is successfully authenticated, the user is then given access to one of the client virtual machines that provides the cloud-based service to Cloud Service Customer 10a, for example Client Virtual Machine 36 shown in FIGS. 2 and 3, and step 100 is followed by step 102.

At step 102, in response to a high level storage object operation being requested by application code in the Client Virtual Machine 36 while providing the cloud-based service to the user, credentials associated with Client Virtual Machine 36 and the user's credentials are made available to entities in cloud storage administrative domain (e.g. within the Cloud Storage System Trusted Environment 32 of FIGS. 2 and 3). In the case where hypervisor-based authentication of client virtual machine identifiers is available (i.e. client virtual machine identifiers are guaranteed not to be forged), credentials associated with the Client Virtual Machine 36 may be made up of the virtual machine identifier of Client Virtual Machine 36. Alternatively, in the case where hypervisor-based authentication of client virtual machine identifiers is not available, credentials associated with the Client Virtual Machine 36 may include both the virtual machine identifier of Client Virtual Machine 36 and a digital signature (e.g. HMAC signature). In either case, the credentials of the Client Virtual Machine 36 and the user credentials may be passed from the Client Virtual Machine 36, through an underlying hypervisor, to a trusted component, e.g. Trusted Component 44 in FIGS. 2 and 3.

At step 104, Client Virtual Machine 36 is authenticated within the Cloud Storage System Trusted Environment 32, for example by the Trusted Component 44 based on the provided client virtual machine credentials. As described above, in the case where the hypervisor guarantees that virtual machine identifiers cannot be forged, the Trusted Component 44 relies on the virtual machine identifier provided from the client virtual machine through the hypervisor to be authentic. Alternatively, where the hypervisor does not provide a guarantee that the virtual machine identifier provided by the Client Virtual Machine 36 has not been forged, then Client Virtual Machine 36 may be authenticated as an additional part of sending, by way of a message passing or other specific type of operation, the storage object operation and user credentials from the Client Virtual Machine 36 to the Trusted Component 44 through the hypervisor, for example based on a digital signature contained in the message (e.g. HMAC) and an associated shared secret (i.e. secret key shared by the Client Virtual Machine 36 and the Trusted Component 44).

If the Client Virtual Machine 36 is successfully authenticated, then the identity of the Client Virtual Machine 36 is used in the Cloud Storage System Trusted Environment 32 to determine a customer-specific set of backend storage resources associated with a customer to which Client Virtual Machine 36 belongs (e.g. Cloud Service Customer 10a of FIG. 1). The determination of the tenant identifier, address and/or name of such customer specific set of backend storage resources may, for example, be performed by the Trusted Component 44. For example, a tenant identifier determined in this way identifies storage resources in a backend storage system that are dedicated to providing service to Cloud Service Customer 10a. The storage object operation is then passed to the backend storage system with the tenant identifier and the user credentials. At step 106, the backend storage system uses the provided user credentials to authorize access to the specific storage objects accessed by the requested storage object operation.

Thus there is disclosed a system and method that offers a file-level or database-level scalable and secure storage virtualization solution for use by virtual machines used to provide cloud-based services. The disclosed approach effectively para-virtualizes a client virtual machine storage software stack by splitting a portion of the stack into "open" and "trusted" components. The untrusted component is exposed in the untrusted client virtual machines. The untrusted component can offer completely unchanged application APIs to applications, and communicates with the trusted component over a secure hypervisor-based transport. The trusted component is deployed in trusted access point virtual machines that communicate with the distributed storage backend. Advantageously, if the distributed storage backend does not offer multi-tenancy natively, the disclosed system allows for the convenient addition of the multi-tenancy feature. The disclosed system also allows for enforcing client virtual machine-specific access rights to the backend storage system, thus limiting the effect of malicious actions should a customer's client virtual machine become compromised, and allows for traffic shaping of request streams on a per-client virtual machine basis.

The disclosed system can take the form of an entirely software-based embodiment, an entirely hardware-based embodiment, or an embodiment containing both software and hardware elements. The figures include block diagram and flowchart illustrations of methods, apparatus(es) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method comprising:
receiving a storage object operation by an untrusted component contained in a client virtual machine;
passing said storage object operation together with a digital signature associated with said client virtual machine through a hypervisor on which said client virtual machine is executing to a trusted component, wherein said trusted component is contained within an access point virtual machine;
processing said storage object operation by said trusted component, said processing including obtaining an identifier of said client virtual machine and determining a customer-specific set of backend storage resources associated with said client virtual machine based on said identifier of said client virtual machine, wherein said customer-specific backend storage resources are associated with an address for a backing store access point, and wherein said processing includes authenticating said client virtual machine based at least in part on said digital signature passed to said trusted component with said storage object operation;

passing said storage object operation from said trusted component to said address for said backing store access point; and performing said storage object operation on said customer-specific set of backend storage resources.

2. The method of claim 1, wherein said address for said backing store access point comprises an IP address.

3. The method of claim 1, wherein said address for said backing store access point comprises a tuple.

4. The method of claim 1, wherein said address for said backing store access point comprises a root directory location.

5. The method of claim 1, wherein said digital signature associated with said client virtual machine comprises an HMAC (Hashed Message Authentication Codes).

6. The method of claim 1, wherein said digital signature associated with said client virtual machine is created at least in part based on a secret key shared by said client virtual machine and said trusted component.

7. A system comprising:
at least one processor and a non-transitory computer readable storage medium, said non-transitory computer readable storage medium having program code stored thereon, said program code comprising:
program code for receiving a storage object operation by an untrusted component contained in a client virtual machine;
program code for passing said storage object operation together with a digital signature associated with said client virtual machine through a hypervisor on which said client virtual machine is executing to a trusted component, wherein said trusted component is contained within an access point virtual machine;
program code for processing said storage object operation by said trusted component, said processing including obtaining an identifier of said client virtual machine and determining a customer-specific set of backend storage resources associated with said client virtual machine based on said identifier of said client virtual machine, wherein said customer-specific backend storage resources are associated with an address for a backing store access point, and wherein said processing includes authenticating said client virtual machine based at least in part on said digital signature passed to said trusted component with said storage object operation;
program code for passing said storage object operation from said trusted component to said address for said backing store access point; and
program code for performing said storage object operation on said customer-specific set of backend storage resources.

8. The system of claim 7, wherein said address for said backing store access point comprises an IP address.

9. The system of claim 7, wherein said address for said backing store access point comprises a tuple.

10. The system of claim 7, wherein said address for said backing store access point comprises a root directory location.

11. The system of claim 7, wherein said digital signature associated with said client virtual machine comprises an HMAC (Hashed Message Authentication Codes).

12. The system of claim 7, wherein said digital signature associated with said client virtual machine is created at least in part based on a secret key shared by said client virtual machine and said trusted component.

13. A computer program product comprising:
a non-transitory computer readable storage medium, said non-transitory computer readable storage medium having program code stored thereon, said program code comprising:
program code for receiving a storage object operation by an untrusted component contained in a client virtual machine;
program code for passing said storage object operation together with a digital signature associated with said client virtual machine through a hypervisor on which said client virtual machine is executing to a trusted component, wherein said trusted component is contained within an access point virtual machine;
program code for processing said storage object operation by said trusted component, said processing including obtaining an identifier of said client virtual machine and determining a customer-specific set of backend storage resources associated with said client virtual machine based on said identifier of said client virtual machine, wherein said customer-specific backend storage resources are associated with an address for a backing store access point, and wherein said processing includes authenticating said client virtual machine based at least in part on said digital signature passed to said trusted component with said storage object operation;
program code for passing said storage object operation from said trusted component to said address for said backing store access point; and
program code for performing said storage object operation on said customer-specific set of backend storage resources.

14. The computer program product of claim 13, wherein said address for said backing store access point comprises an IP address.

15. The computer program product of claim 13, wherein said address for said backing store access point comprises a tuple.

16. The computer program product of claim 13, wherein said address for said backing store access point comprises a root directory location.

17. The computer program product of claim 13, wherein said digital signature associated with said client virtual machine comprises an HMAC (Hashed Message Authentication Codes).

18. The computer program product of claim 13, wherein said digital signature associated with said client virtual machine is created at least in part based on a secret key shared by said client virtual machine and said trusted component.

* * * * *